Patented Mar. 29, 1949

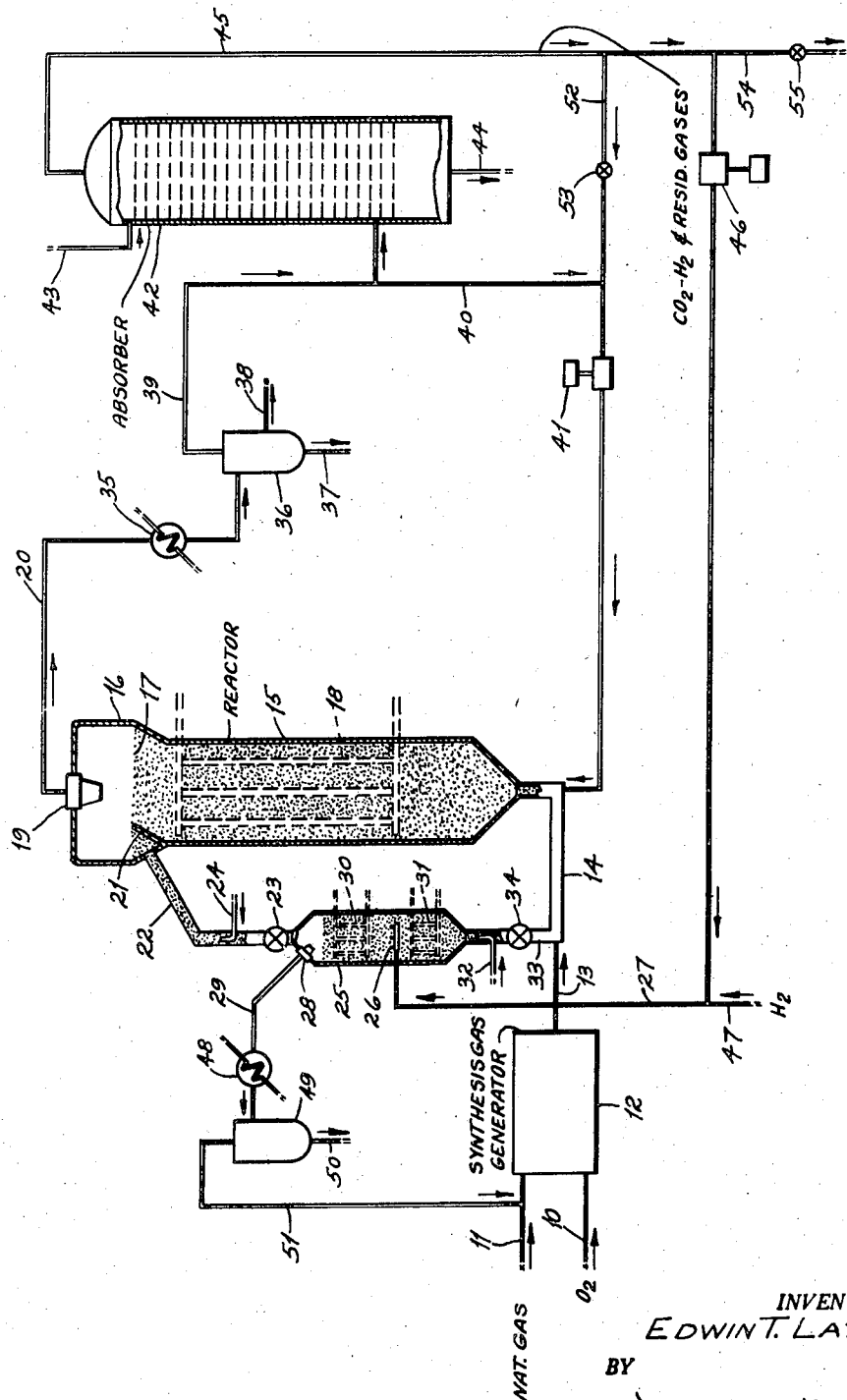

2,465,462

UNITED STATES PATENT OFFICE 2,465,462

CATALYTIC SYNTHESIS OF HYDROCARBONS

Edwin T. Layng, New York, N. Y., assignor to Hydrocarbon Research, Inc., New York, N. Y., a corporation of New Jersey Application January 9, 1947, Serial No. 721,120

11 Claims. (Cl. 260—449.6)

The present invention relates to the catalytic reduction of carbon oxides by hydrogen and more specifically concerns the synthesis of hydrocarbons, oxygen-containing compounds and the like. The term hydrocarbons is used herein to include oxygenated hydrocarbons which may be formed in the course of the synthesis reaction.

Heretofore the catalytic interaction of hydrogen and carbon monoxide for the synthesis of hydrocarbons has been carried out in the presence of a catalyst of the iron group, notably cobalt, nickel, iron or ruthenium, under an appropriate elevated temperature and under an elevated pressure or not, depending upon such factors as the specific catalyst employed and the products required. In general, the reaction, when cobalt is employed as a catalyst, tends to the production of water vapor as a by-product of the hydrocarbon formation in accordance with the reaction:

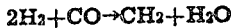

On the other hand, there is a fundamental tendency, where iron catalysts are employed, for the reaction to proceed at least partly in accordance with the reaction:

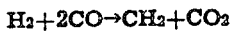

In each of these reactions the symbol $CH_2$ is used to indicate a hydrocarbon fragment which polymerizes or otherwise builds up to hydrocarbons of varying molecular size, depending upon the reaction conditions. Of course, the foregoing tendency, in the case of the iron catalyst, is not controlling in that water vapor may be, and usually is, formed as a by-product, so that, for example, equal quantities of water vapor and carbon dioxide are formed. Moreover, it is possible to overcome the formation of carbon dioxide in large measure by many expedients including a large recycle thereof, elimination of water vapor during the course of the reaction, carrying the reaction to substantial completion, use of special catalysts and conditions of reaction, for example.

In any event, however, economical operation of the process requires utilization of the carbon introduced into the system, for the synthesis of hydrocarbons, and it has therefore been proposed to recycle the appreciable production of carbon dioxide usually encountered, to the feed gas generator for reformation of hydrogen and carbon monoxide.

The feed gas generator, with the advent of economic methods for rectification of substantially pure oxygen from air, may economically carry out the limited combustion of a mixture of a hydrocarbon, such as methane, and oxygen, for the production of a synthesis gas.

In other words, the hydrocarbon and the oxygen interact exothermically at elevated temperatures, in the presence of a suitable catalyst such as nickel, or not, as desired, to form hydrogen and carbon monoxide in the approximate molar ratio of 2:1. Water vapor and/or carbon dioxide will also react with the hydrocarbon, but, however, only to result in a corresponding production of hydrogen and carbon monoxide in the ratio of approximately 3:1 and 1:1, respectively. While these latter reactions were more attractive previous to the economic availability of relatively pure oxygen, they suffered from the tremendous heat requirements and corresponding complexity of apparatus necessitated by the fact that the apparatus must operate at temperatures above 1500° F.

While a certain amount of either water vapor or carbon dioxide may be recycled and consumed in a generator operating primarily for the exothermic interaction of oxygen and a hydrocarbon, a point is soon reached where the energy demands of the endothermic process lower the temperature of the generator below the optimum high temperature required. This disadvantage is magnified by the usual recovery of by-product carbon dioxide at a comparatively low temperature level as contrasted with the high temperature level required in operation of the generator. In addition, the lowered ratio of hydrogen to carbon monoxide in the resulting synthesis gas, where large quantities of carbon dioxide are recycled, is frequently disadvantageous to operation of the synthesis reactor.

In accordance with the present invention, the carbon dioxide, more or less inevitably formed as the result of the synthesis reaction, is treated with hydrogen under conditions such that reaction ensues with the resulting formation of methane and water vapor, the methane being returned to the stream of fresh feed hydrocarbon entering the synthesis gas generator. In short, the invention contemplates conversion of the by-product carbon dioxide to methane prior to its return to the generator, where gas generation proceeds essentially exothermically and without the disadvantages attendant upon excessive use of endothermically reacting feeds.

The hydrogen requirement is met, in part, by the hydrogen content of the fresh feed synthesis gas which, as indicated above, amounts to two mols of hydrogen for each mol of carbon monoxide when operating the generator on methane and oxygen. In the course of the synthesis reaction, each mol of by-product water vapor represents the consumption of two mols of hydrogen and one mol of carbon monoxide, with a complete utilization of carbon for the production of hydrocarbons, while the formation of by-product carbon dioxide represents utilization of only one mol of hydrogen per two mols of carbon monoxide. As a result, the reaction product from the hydrocarbon synthesis reactor, where any substantial proportion of carbon dioxide is involved, includes corresponding proportions of hydrogen which may be made available for reaction with the carbon dioxide to form methane.

The invention is also of particular advantage in connection with the operation of refineries where a further stream of hydrogen is available from other operations, in order to make up the requirements for full consumption of excess carbon dioxide. In other words, the formation of one mol of carbon dioxide is at least theoretically accompanied by the appearance of three mols of unreacted hydrogen in the synthesis generator effluent. However, the interaction of carbon dioxide normally follows the reaction:

$$CO_2 + 4H_2 \rightarrow CH_4 + 2H_2O$$

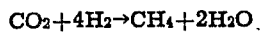

Thus, some additional hydrogen is required for complete utilization of carbon dioxide and, as indicated above, where such a product is available, it permits operation of the synthesis reaction under conditions which involve elimination of carbon dioxide as a final by-product, a feature which is usually of great advantage insofar as economical operation is concerned.

It is important to note that the interaction of carbon dioxide and hydrogen is highly exothermic and, accordingly, affords a source of heat energy which may be desirable in operations of the present character, to provide steam for mechanical and electrical operations and to effect heating or preheating of the several reactants.

The invention is of further advantage in permitting the use of synthesis catalyst for promoting the hydrogen-carbon dioxide reaction. The synthesis catalysts conventionally employed for the preparation of higher hydrocarbons from hydrogen and carbon monoxide are also effective to catalyze the former reaction and thus the two processes may be carried out concurrently using the same batch of catalyst. While many modifications of this principle will occur to those skilled in the art, one illustrative arrangement may utilize a circulating, fluidized catalyst passing cyclically through two successive reaction zones, one receiving reactants comprising hydrogen and carbon monoxide for the production of higher hydrocarbons, and the other catalyzing the reaction of hydrogen and carbon dioxide for the selective production of methane.

As is well known, the technique of fluidization involves the passage of reactant gases through a finely powdered mass of catalyst at such rate as to maintain each particle suspended or buoyed up in the upflowing gases, so that the particles have a random vibratory movement and the whole mass of powder simulates a boiling liquid, with an upper pseudo-liquid level from which the reaction gases are liberated. Accordingly, the catalyst powder assumes a state of fluidity in which it may be readily handled and caused to flow in any desired path. With such an arrangement, the catalyst may be readily caused to flow, at any required rate, out of the synthesis reaction zone to the methane reaction zone and return, by way of any desired cooling, treating or catalyst stripping or regeneration zones as required. Such cyclic operation, as the result of varying treatments, tends to maintain the catalyst in ideal form for performing each of its functions in the system.

The by-product carbon dioxide and hydrogen may be handled broadly in any convenient manner prior to being fed to the methane synthesis step. The effluent from the synthesis reactor normally contains, in addition to water vapor, carbon dioxide and normally liquid hydrocarbons, some proportion of hydrocarbon gases, and possibly some residual carbon monoxide and hydrogen. The water vapor and normally liquid hydrocarbons are conventionally removed by condensation and separation. The normally gaseous hydrocarbons may be handled in any appropriate economic manner. Thus, where desirable as such, they may be separated in any conventional manner. So also the carbon dioxide and hydrogen may be derived as separate streams from any suitable gas recovery system, and supplied separately to the methane synthesis zone. On the other hand, it is an advantage of the present invention that it permits the entire gaseous effluent or any selected part thereof to be returned for synthesis gas preparation. Thus, where any portion of the gaseous hydrocarbons are most effectively used in the synthesis of liquid hydrocarbons, these may be recycled to the synthesis gas generator, preferably by way of the methane synthesis zone in admixture with the hydrogen and carbon dioxide.

Reference is now made to the drawing wherein one preferred embodiment of the present invention is more or less diagrammatically represented for the purpose of better illustrating the present invention. Therein the numerals 10 and 11 represent, respectively, supply pipes for fresh feed oxygen and natural gas received from suitable sources not shown. These gases are fed into a synthesis gas generator 12, symbolically represented, and the product, namely, synthesis gas comprising essentially hydrogen and carbon monoxide in the approximate molar ratio of 2:1, is removed through outlet pipe 13. It is, of course, to be understood that the invention contemplates preheating of the feed gases, either as a part of operation of the gas generator or otherwise, by means not shown, in order to promote effective, substantially quantitative operation of the gas generation step.

The synthesis gas first cooled to an appropriate temperature below that of the subsequent step is injected into the conduit 14, where it picks up powdered catalyst from a source later to be described, and conveys it into the lower portion of the synthesis reactor 15.

Since the synthesis reactor may follow any conventional pattern, no detailed description will be given. Suffice it to say that the reactor comprises a generally cylindrical vessel, cone-shaped at its lower portion and provided with a somewhat dome-shaped, expanded upper portion 16. The catalyst in finely divided form occupies the vessel up to the upper pseudo-liquid level 17 and immerses a suitable heat exchanger 18 indicated in dotted lines. The gaseous reaction products leave the pseudo-liquid level 17 and pass through a filter 19 to the outlet pipe 20.

It is to be understood that the catalyst powder will comprise any of the conventional catalysts for the reduction of carbon monoxide by hydrogen. Such are usually metals of the iron group, for example, iron, nickel, cobalt and ruthenium, either as such or supported on any suitable catalyst carrier such as silica gel, alumina, magnesia or diatomaceous earth. It is also contemplated that the catalyst include any conventional promoter or activator such as compounds of the alkali metals or alkaline earth metals, as well as alumina, thoria and the like, in usual, relatively small proportions.

The particle size of the powdered catalyst may vary widely depending on the rate of flow of the reactant gases, the density of the catalyst, etc. Normally the powder should be finer than 100 mesh, although the only limitation as to maximum particle size is determined by the ability to fluidize the powder in the prevailing flow of reactant gases. Obviously, and as is known in the art of fluidization, this function depends on other factors than particle size, notably particle shape, density and the like. It is advantageous to use a reactor so shaped as to promote substantially uniform distribution of gases through all parts of the powdered mass of catalyst. In this connection also, it is desirable to employ a heat exchanger so designed as to permit relatively streamlined flow of gases with an absence of so-called dead spots, where fluidization of catalyst is impaired.

Reverting to the drawing, means are provided for controlledly withdrawing catalyst from the upper portion of the reactor, comprising a baffle 21 over which catalyst tends to flow. The space in back of the baffle 21 communicates with a standpipe 22 having at its lower portion any suitable valve such as a star feeder 23. Inlet pipe 24 extends into the standpipe 22 for maintaining the powder in fluidized state suitable for even flow and may be supplied with methane, hydrogen or any other desired gas, whether inert or active, so that the powder may be stripped, regenerated, or otherwise treated. In fact, introduction of a suitable stripping gas will tend to remove adsorbed hydrocarbons from the catalyst in the standpipe, the described products and stripping gas passing into the upper portion 16 of the reactor 15 and emerging with the reaction products through pipe 20.

The catalyst powder handled by the feeder 23 gravitates into a methane synthesis zone formed by a vessel 25 provided internally with a distributing head 26 for reactant gases comprising hydrogen and carbon dioxide supplied by way of pipe 27 from sources hereinafter to be described. The incoming reactant gases flow upwardly through the catalyst in a state of dense phase fluidization to the level shown and the reaction product passes outwardly through filter 28 and pipe 29.

In the methane synthesis zone the incoming hydrogen and carbon dioxide, in the molar ratio of about 4:1 react under elevated temperature and pressure with the formation essentially of methane. The optimum temperature for this reaction will vary with the catalyst employed, but in the case of the iron catalyst mentioned, a temperature in the range of 800–900° F. is usually suitable. A heat exchanger 30, indicated in dotted lines, is provided to maintain the desired temperature.

A further cooling surface arrangement 31 in the vessel 25 below the methane synthesis zone permits additional cooling of the catalyst prior to its return to the synthesis reactor 15. Thus, for example, with reactor 15 operating at a temperature of 600° F. and the methane synthesis zone at a temperature of 850° F., it is advisable to cool the catalyst to a temperature below 600° F., say 550° F., before introduction into the reactor. The cooling device 31 may embody a construction of the type previously described, namely, a bundle of heat exchanger tubes with suitable headers held at such a temperature as to cool the powder to the desired level. The cooling devices 18, 30 and 31 may be best exemplified by a suitably streamlined assembly of the character described, supplied with an internal circulation of water, Dowtherm, or any other suitable coolant. In any event, with suitable temperature control of the cooling surfaces, the fluidized powder will transfer heat energy thereto at a rate characteristic of good transfer with a liquid, the particles assuming a quite uniform condition of temperature in the surrounding zone.

In order to assure good fluidization about the exchanger 31, I have provided an inlet pipe 32 for introducing a gas, such as hydrogen or methane, from any suitable source, not shown.

The thus treated catalyst is fed, at a regular predetermined rate through lower standpipe 33 by way of valve or star feeder 34 into the inlet conduit 14, where it is picked up in the synthesis gas feed as previously indicated. Accordingly, the catalyst circulates through the reactor 15 over the baffle 21, down through standpipe 22 where it may be stripped and/or regenerated, through the methane synthesis zone and the later cooling zone, and back to the inlet of the reactor. The cooling of the catalyst subsequent to the methane synthesis step may also be carried out advantageously in a separate vessel.

Referring now to the gaseous reaction products in pipe 20, these pass by way of condenser 35 to a separator 36, where the condensed water layer is removed by way of pipe 37 while the hydrocarbon layer passes off through pipe 38 to any suitable equipment, not shown, for further treatment or use. In the usual course, this stream passes into fractionation and other refining devices for separating the stream into desired product fractions.

The normally gaseous residue passes overhead through pipe 39, a portion being available for recirculation to the reactor 15 by way of branch pipe 40 and pump 41. The remaining portion is fed to the scrubbing tower 42. Scrubbing liquid, which may be a hydrocarbon fraction or other liquid operative to absorb all or any desired fraction of the normally gaseous hydrocarbons in the gaseous residue stream is introduced through line 43 near the top of the tower and passes downwardly in countercurrent scrubbing relationship to the upflowing gases. The scrubbed gases are removed from the top of the tower by pipe 45 and the scrubbing liquid with absorbed constituents is removed through outlet pipe 44 for recovery of the absorbed constituents and may be then returned to the tower by way of pipe 43.

The scrubbed gases comprising carbon dioxide and hydrogen pass through pipe 45 and pump 46 to previously described inlet pipe 27 leading to the methane synthesis zone. Branch pipe 47 supplies the additional hydrogen requirement from any suitable source. Thus, the carbon dioxide, together with an appropriate admixture of hydrogen, passes into the methane synthesis zone, is reacted to methane and water vapor, and the reaction gases flow through pipe 29 to condenser 48 and separator 49 operating to remove the condensed water via pipe 50 and deliver the methane-rich gas into pipe 51. As clearly shown, pipe 51 feeds directly into methane inlet pipe 11, so that the synthetic methane supplements the normal fresh feed.

Where desired, a portion or substantially all of the gas stream in pipe 40 may be sent directly to the methane synthesis reactor 25 by way of pipe 52, valve 53, pipe 45 and pump 46.

The branch pipe 54 in line 45 serves by control of valve 55 to vent gas to maintain the system in material balance and to discard inert gases like nitrogen which enter the system as impurities of the oxygen stream or otherwise.

In order to illustrate the invention by one specific example, natural gas and substantially pure oxygen are introduced into a synthesis generator at a molar ratio (including recycled hydrocarbon) of approximately 2:1. The generator operates at a temperature of about 2100° F., the gaseous product comprising essentially hydrogen and carbon monoxide in the molar ratio of 2:1. This is cooled to 550° F. and supplied into a synthesis reactor occupied by iron catalyst powder containing about 1% potassium oxide and about 2% aluminum oxide. The synthesis reactor operates at a temperature of 600° F. (±10° F.) throughout the mass of powdered catalyst and at a pressure of 225 pounds per square inch gauge.

The catalyst comprises a powder of 200 mesh and finer, about 65% passing a 325 mesh screen. The powder is maintained in a state of dense phase fluidization by the upflowing reactant gases passing at the rate of about 2 feet per second. Total contact time is about 15 seconds and the reaction gases are collected, cooled to 80° F. and the resulting liquid layers of hydrocarbon and water are separated. The hydrocarbon layer consists essentially of hydrocarbons boiling in the motor gasoline range.

The residual gases from the separation step are subjected at a suitably low temperature to scrubbing with a gas oil boiling in the range of about 450–650° F., to remove the major portion of hydrocarbon gases. To the scrubbed gas is added sufficient hydrogen to furnish a mixture containing four mols of hydrogen for each mol of carbon dioxide. This mixture is passed through a mass of the same iron catalyst held at a temperature of 850° F.; contact time is about five seconds. The reaction product is cooled to separate water vapor and the gaseous residue, consisting essentially of methane, supplied to make up the fresh feed of hydrocarbon gas to the synthesis gas generator.

Hydrogen may be introduced into pipe 24 for stripping and regenerating the catalyst. Such addition of hydrogen during the stripping step will tend to decrease the quantity of hydrogen that may have to be added through pipe 47.

The production of carbon dioxide will vary depending upon how the synthesis reaction is carried out. The invention is operative irrespective of such variation. It is important to point out that variation in the production of carbon dioxide with different synthesis systems means that the hydrogen stream must be adjusted in each case so as to supply a hydrogen-carbon dioxide mixture to the methane synthesis step in the molar ratio of approximately 4:1.

Reference hereinabove to methane and oxygen as fresh feed to the synthesis gas generator has been solely for the purposes of convenience in description, and it is to be specifically understood that the invention is not so limited, but may operate with an initial feed of any suitable hydrocarbons. While gaseous hydrocarbons within the $C_1$ to $C_4$ range may be preferred, even liquid or heavier hydrocarbons are suitable, as is known.

Oxygen charged to the synthesis gas generator may be substantially pure oxygen, and advantageously of at least about 90% purity.

Obviously, many modifications and variations of the invention will be apparent to those skilled in the art in the light of the foregoing, without any enlargement of the spirit and scope thereof, and accordingly, only such limitations should be imposed as are indicated in the appended claims.

I claim:

1. In the synthesis of hydrocarbons by a step including the catalytic reduction of carbon monoxide with hydrogen wherein the reaction products include carbon dioxide, the improvement which includes, reacting said carbon dioxide with hydrogen to generate methane and by-product water vapor, separating said by-product water vapor from the product stream of methane, subjecting said methane to partial combustion with molecular oxygen in proportions effective to form a synthesis gas containing essentially hydrogen and carbon monoxide, supplying said synthesis gas to the first-named step for the catalytic reduction of carbon monoxide and the synthesis of additional hydrocarbons, and recovering hydrocarbons from the reaction product of said first-named step.

2. In the synthesis of liquid hydrocarbons by a step including the catalytic reduction of carbon monoxide with hydrogen wherein the reaction products include carbon dioxide, the improvement which includes, reacting said carbon dioxide with hydrogen to generate a hydrocarbon gas and by-product water vapor, separating said by-product water vapor from the product stream of hydrocarbon gas, subjecting said hydrocarbon gas to partial combustion with molecular oxygen in proportions effective to form a synthesis gas containing essentially hydrogen and carbon monoxide, supplying said synthesis gas to the first-named step for the catalytic reduction of carbon monoxide and the synthesis of additional liquid hydrocarbons, and recovering hydrocarbons from the reaction product of said first-named step.

3. In the synthesis of hydrocarbons containing more than one carbon atom by a step including the catalytic reduction of carbon monoxide with hydrogen wherein the reaction products include carbon dioxide, the improvement which includes, reacting said carbon dioxide with hydrogen to generate methane and by-product water vapor, separating said by-product water vapor from the product stream of methane, subjecting said methane to partial combustion with molecular oxygen in proportions effective to form a synthesis gas containing essentially hydrogen and carbon monoxide, supplying said synthesis gas to the first-named step for the catalytic reduction of carbon monoxide and the synthesis of additional hydrocarbons, and recovering hydrocarbons from the reaction product of said first-named step.

4. In the synthesis of hydrocarbons containing more than one carbon atom by the catalytic reduction of carbon monoxide with hydrogen, the method of consuming by-product carbon dioxide formed in said synthesis, which comprises converting said carbon dioxide to methane by reacting said carbon dioxide with hydrogen in the presence of a catalyst effective to promote the synthesis of methane, separating from the reaction product stream of methane by-product water vapor contained therein, subjecting the residual methane to partial combustion with molecular oxygen in relative proportion such as to form synthesis gas containing essentially hydrogen and carbon monoxide and converting said synthesis gas to additional hydrocarbons containing more than one carbon atom by the catalytic reduction of carbon monoxide with hydrogen 5. In the synthesis of liquid hydrocarbons by the catalytic reduction of carbon monoxide with hydrogen, the method of consuming by-product carbon dioxide formed in said synthesis, which comprises converting said carbon dioxide to a lower hydrocarbon by reacting said carbon dioxide with hydrogen in the presence of a catalyst effective to promote the synthesis of said lower hydrocarbon, separating from the reaction product stream of said lower hydrocarbon by-product water vapor contained therein, subjecting said lower hydrocarbon to partial combustion with molecular oxygen in proportions effective to form synthesis gas containing essentially hydrogen and carbon monoxide and converting said synthesis gas to additional liquid hydrocarbons by the catalytic reduction of carbon monoxide with hydrogen.

6. In the synthesis of hydrocarbons containing more than one carbon atom by the catalytic reduction of carbon monoxide with hydrogen, the method of consuming by-product carbon dioxide formed in the synthesis, which comprises converting carbon dioxide to methane by the action of hydrogen in the presence of a catalyst at an elevated temperature at which said carbon dioxide is reduced to methane with production of by-product water vapor, separating said by-product water vapor from the product stream of methane, subjecting methane at an elevated temperature in the presence of oxygen to partial combustion to form a synthesis gas containing essentially hydrogen and carbon monoxide, and converting said synthesis gas to additional hydrocarbons containing more than one carbon atom in the presence of a catalyst at an elevated temperature.

7. A process for the manufacture of hydrocarbons, oxygenated hydrocarbons and the like which comprises generating synthesis gas consisting essentially of carbon monoxide and hydrogen in a synthesis gas generating zone by exothermic reaction of carbonaceous material with molecular oxygen, subjecting resulting synthesis gas to contact in a synthesis zone with a synthesis catalyst comprising a metal of the iron group, effecting said contact under conditions such that said products, as well as carbon dioxide, are produced in substantial amounts, withdrawing from the synthesis reaction zone an effluent stream containing desired products and carbon dioxide, removing from the withdrawn effluent desired products and a gas comprising carbon dioxide, passing said carbon dioxide gas to a separate conversion zone, subjecting it therein to reaction with hydrogen under conditions such that carbon dioxide undergoes exothermic conversion to methane, passing resulting methane to said generating zone, and effecting partial combustion therein with oxygen to form synthesis gas.

8. A process for the manufacture of hydrocarbons, oxygenated hydrocarbons and the like which comprises generating synthesis gas consisting essentially of carbon monoxide and hydrogen in a synthesis gas generating zone by exothermic reaction of carbonaceous material with molecular oxygen, subjecting resulting synthesis gas to contact in a synthesis zone with a synthesis catalyst comprising a metal of the iron group, effecting said contact under conditions such that said products, as well as carbon dioxide, are produced in substantial amounts, withdrawing from the synthesis reaction zone an effluent stream containing desired products and carbon dioxide, removing from the withdrawn effluent desired products and a gas comprising carbon dioxide, passing said carbon dioxide gas to a separate conversion zone, subjecting said gas to contact therein with hydrogen under conditions such that carbon dioxide undergoes exothermic conversion into methane and water, withdrawing from said separate zone a product stream containing methane and water vapor, removing water from said product stream, passing residual methane to said generating zone, and effecting partial combustion therein with oxygen to form synthesis gas.

9. A process for the manufacture of hydrocarbons, oxygenated hydrocarbons and the like which comprises subjecting a hydrocarbon gas containing methane to partial combustion with oxygen in a synthesis gas generating zone to form synthesis gas consisting essentially of carbon monoxide and hydrogen, conducting resulting synthesis gas to a synthesis reaction zone, subjecting it therein to contact with a fluidized mass of solid particulate iron catalyst, effecting said contact under elevated pressure and at a temperature in the range of about 550° and higher, such that there is substantial conversion of synthesis gas into said products and carbon dioxide, withdrawing from the synthesis reaction zone an effluent stream containing desired products and carbon dioxide, removing from the withdrawn stream desired products and a gas comprising carbon dioxide gas to a separate conversion zone, subjecting it therein to contact with hydrogen under conditions such that carbon dioxide undergoes exothermic conversion into methane and water, withdrawing from said separate zone a product stream containing methane and water vapor, removing water from said product stream, passing residual methane to said generating zone, and effecting partial combustion therein with oxygen to form synthesis gas.

10. A process for the manufacture of hydrocarbons, oxygenated hydrocarbons and the like which comprises generating synthesis gas consisting essentially of carbon monoxide and hydrogen in a synthesis gas generating zone by exothermic reaction of carbonaceous material with molecular oxygen, subjecting resulting synthesis gas to contact in a synthesis reaction zone with a mass of fluidized, solid particulate synthesis catalyst of the iron type at a predetermined elevated temperature such that synthesis gas is converted into said products and carbon dioxide in substantial amounts, withdrawing from the reaction zone an effluent stream containing desired products and carbon dioxide, removing from said stream desired products and a gas comprising carbon dioxide, passing said carbon dioxide gas in contact with a fluidized mass of said catalyst in a separate conversion zone in the presence of hydrogen, effecting contact in said separate zone at a temperature such that carbon dioxide undergoes exothermic conversion into methane and water, withdrawing from said separate conversion zone a stream of methane containing water vapor, removing water vapor therefrom, passing residual methane to said synthesis gas generating zone for partial combustion therein with oxygen to form synthesis gas and circulating the catalyst through and between said synthesis reaction and said separate conversion zones.

11. The process according to claim 10, in which the contact in said separate conversion zone is effected at a temperature substantially higher than that in said synthesis reaction zone.

EDWIN T. LAYNG.

REFERENCES CITED

The following references are of record in the file of this patent:

UNITED STATES PATENTS

| Number | Name | Date |
|---|---|---|
| 943,627 | Elworthy | Dec. 14, 1909 |
| 2,244,710 | Kolbel | June 10, 1941 |
| 2,264,427 | Asbury | Dec. 2, 1941 |
| 2,324,172 | Parkhurst | July 13, 1943 |